(12) United States Patent
Oslake et al.

(10) Patent No.: US 7,974,827 B2
(45) Date of Patent: Jul. 5, 2011

(54) RESOURCE MODEL TRAINING

(75) Inventors: John M Oslake, Seattle, WA (US);
Pavel A Dournov, Redmond, WA (US);
Jonathan C. Hardwick, Kirkland, WA (US); Kevin J Savage, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 11/739,061

(22) Filed: Apr. 23, 2007

(65) Prior Publication Data

US 2008/0262823 A1 Oct. 23, 2008

(51) Int. Cl.
G06F 9/45 (2006.01)
G06F 9/455 (2006.01)
G06F 15/18 (2006.01)
G06G 7/62 (2006.01)

(52) U.S. Cl. .............. 703/22; 703/13; 703/26; 706/12
(58) Field of Classification Search .............. 703/13
See application file for complete search history.

(56) References Cited

U.S. PATENT DOCUMENTS

| | | | |
|---|---|---|---|
| 5,668,995 A | 9/1997 | Bhat | |
| 5,881,268 A | 3/1999 | McDonald et al. | |
| 6,044,065 A | 3/2000 | Andersson et al. | |
| 6,233,610 B1 | 5/2001 | Hayball et al. | |
| 6,259,448 B1 | 7/2001 | McNally et al. | |
| 6,311,175 B1 | 10/2001 | Adriaans et al. | |
| 6,470,464 B2 | 10/2002 | Bertram et al. | |
| 6,560,569 B1 * | 5/2003 | Abu El Ata | 703/2 |
| 6,601,233 B1 | 7/2003 | Underwood | |
| 6,701,363 B1 | 3/2004 | Chiu et al. | |
| 6,738,736 B1 * | 5/2004 | Bond | 703/2 |
| 6,782,354 B1 | 8/2004 | Ikegami | |
| 6,996,811 B2 | 2/2006 | Nishioka et al. | |
| 7,035,786 B1 | 4/2006 | Abu El Ata et al. | |
| 7,090,749 B2 | 8/2006 | Flores et al. | |
| 7,668,703 B1 * | 2/2010 | Rolia et al. | 703/2 |
| 7,877,250 B2 | 1/2011 | Oslake et al. | |
| 2002/0052725 A1 | 5/2002 | Wasynczuk et al. | |
| 2002/0052726 A1 | 5/2002 | Tajima et al. | |
| 2002/0095434 A1 | 7/2002 | Lane | |
| 2002/0120921 A1 | 8/2002 | Coburn et al. | |
| 2003/0061362 A1 | 3/2003 | Qiu et al. | |
| 2003/0088492 A1 | 5/2003 | Damschroder | |
| 2003/0120780 A1 | 6/2003 | Zhu et al. | |
| 2003/0139917 A1 | 7/2003 | Hardwick et al. | |
| 2003/0177160 A1 | 9/2003 | Chiu et al. | |
| 2003/0225563 A1 | 12/2003 | Gonos | |
| 2003/0225876 A1 | 12/2003 | Oliver et al. | |
| 2004/0002839 A1 | 1/2004 | Ulrich | |
| 2004/0031015 A1 | 2/2004 | Ben-Romdhane et al. | |

(Continued)

OTHER PUBLICATIONS

Chen, et al., "Performance Prediction of Component-based Applications", available at least as early as Jan. 10, 2007, at <<http://www.ug.it.usyd.edu.au/~iango/papers/jss_paper_draft_0503.pdf>>, pp. 1-12.

(Continued)

*Primary Examiner* — David Silver
*Assistant Examiner* — Angel J Calle
(74) *Attorney, Agent, or Firm* — Lee & Hayes, PLLC

(57) ABSTRACT

Operational resource modeling is usable to analyze application and computer system performance over a wide range of hypothetical scenarios. Operational resource modeling involves creating and training one or more resource models, and/or simulating hypothetical scenarios using resource models.

17 Claims, 14 Drawing Sheets

U.S. PATENT DOCUMENTS

| | | | |
|---|---|---|---|
| 2004/0098294 A1 | 5/2004 | Dean et al. | |
| 2004/0167765 A1* | 8/2004 | Abu El Ata | 703/22 |
| 2004/0220792 A1 | 11/2004 | Gallanis et al. | |
| 2004/0267897 A1* | 12/2004 | Hill et al. | 709/217 |
| 2005/0086335 A1* | 4/2005 | Liu et al. | 709/223 |
| 2005/0125213 A1* | 6/2005 | Chen et al. | 703/22 |
| 2005/0154735 A1 | 7/2005 | Breh et al. | |
| 2005/0256692 A1 | 11/2005 | Monin et al. | |
| 2006/0025984 A1* | 2/2006 | Papaefstathiou et al. | 703/22 |
| 2006/0025985 A1 | 2/2006 | Vinberg et al. | |
| 2006/0074970 A1 | 4/2006 | Narayanan et al. | |
| 2006/0161884 A1* | 7/2006 | Lubrecht et al. | 717/104 |
| 2006/0190944 A1 | 8/2006 | Moon et al. | |
| 2006/0206298 A1 | 9/2006 | Kuchler et al. | |
| 2006/0235664 A1 | 10/2006 | Vinberg et al. | |
| 2006/0235675 A1 | 10/2006 | Oslake et al. | |
| 2007/0006177 A1* | 1/2007 | Aiber et al. | 717/136 |
| 2007/0250838 A1* | 10/2007 | Belady et al. | 718/105 |
| 2008/0059972 A1* | 3/2008 | Ding et al. | 718/105 |
| 2008/0184230 A1* | 7/2008 | Leech et al. | 718/100 |
| 2008/0262822 A1 | 10/2008 | Hardwick et al. | |
| 2008/0262823 A1 | 10/2008 | Oslake et al. | |

OTHER PUBLICATIONS

Harbour, et al., "MAST An Open Environment for Modeling, Analysis, and Design of Real-Time Systems", available at least as early as Jan. 10, 2007, at <<http://citeseer.ist.psu.edu/cache/papers/cs/30959/http:zSzzSzwww.ctr.unican.eszSzpublicationszSzmgh-jlm-jjg-jcp-jmd-2002a.pdf/mast-an-open-environment.pdf>>, pp. 1-16.

"IEC 61499 Resource Model", at <<http://www.isagraf.com/pages/products/iec61499technotes/IEC61499_resource_model.pdf>>, ICS Triplex ISaGRAF Inc., 2006, pp. 2.

"Modelling the Behavior of Solaris Resource Manager Software", at <<http://www.sun.com/blueprints/0899/solaris4.pdf>>, Sun Microsystems Inc., 1999, pp. 16.

Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz..zSzIMACS97x.pdf/simalytic-hybrid-modeling-planning.pdf>>, Colorado Technical University, 1997, pp. 1-7.

Rajeshwari, "Performance Models—Applying the Arcane", at <<http://www.infosys.com/technology/CRN-0205-01.pdf>>, Infosys Technologies Ltd, 2002, pp. 2.

Selic, "A Generic Framework for Modeling Resources with UML", available at least as early as Jan. 10, 2007, at http://ieeexplore.ieee.org/iel5/2/18367/00846320.pdf?isNumber=>>, IEEE, Jun. 2000, pp. 64-69.

"Simulation Performance Models", retrieved on Jun. 26, 2007, at <<http://www.frontrunnercpc.com/info/simulation.htm>>, FrontRunner Computer Performance Consulting, 2002, pp. 2.

U.S. Appl. No. 11/105,251, filed Apr. 13, 2005, Pavel A. Dournov, John M. Oslake, Efstathios Papaefstathiou, Glenn R. Peterson.

U.S. Appl. No. 11/394,474, filed Mar. 31, 2006, Workman.

U.S. Appl. No. 11/772,059, filed Jun. 29, 2007, Jonathan C. Hardwick, Pavel A. Dournov, Hemanth Kaza, John M. Oslake, Glenn R. Peterson.

U.S. Appl. No. 11/739,063, filed Apr. 23, 2007, John M. Oslake, Pavel A. Dournov, Jonathan C. Hardwick, Kevin J. Savage.

U.S. Appl. No. 11/739,067, filed Apr. 23, 2007, John M. Oslake, Pavel A. Dournov, Jonathan C. Hardwick, Kevin J. Savage.

Engineering Enterprise Sun BluePrints Online, "Modelling the Behavior of Solaris Resource Manager Software", Sun Microsystems Inc., Aug. 1999, pp. #1-pp. #16.

Office Action from U.S. Appl. No. 11/739,061 dated Aug. 19, 2010, 29 pages.

* cited by examiner

RESOURCE MODEL TRAINING

This application is related to concurrently-filed U.S. patent application Ser. No. 11/739,067 and U.S. patent application Ser. No. 11/739,063, both of which are incorporated herein by reference.

BACKGROUND

Capacity planning involves determining what hardware and software configurations are best suited to meet the needs of an application in a computing system in various hypothetical scenarios. A transaction modeling technique can be used to model performance of the application and the computing system, which enables development of capacity planning solutions for arbitrarily complex software applications. These solutions facilitate the analysis of application and computer system performance over a wide range of hypothetical scenarios. However, development of a customized performance model for an application requires significant investments in terms of skilled labor and capital expenditure. Furthermore, the customized performance model for the application cannot be easily adapted to provide a model of a different application.

Alternatively, trending of historical data and forecasting techniques can provide a capacity planning solution for arbitrary applications without requiring performance model customization. However, this technique severely limits the range of hypothetical scenarios supported and thereby limits applicability of the solution.

Moreover, currently available methods for developing performance models generally require a user to manually configure relationships between components of the system in order to take into account the effect of the various dependencies in the system.

SUMMARY

This summary is provided to introduce simplified concepts of operational resource modeling, which is further described below in the Detailed Description. This summary is not intended to identify essential features of the claimed subject matter, nor is it intended for use in determining the scope of the claimed subject matter. Generally, operational resource modeling involves creating and training resource models for components in a system, and using the resource models to simulate hypothetical scenarios.

Resource models may be created by selecting a resource model template that matches a component of the system for which the resource model is being created. The selected template can be then customized to fit an instance of a specific application on the system. The resource model template may in turn be created by generating a template manifest and modeling logic. In that case, the template manifest declares performance metrics usable to parameterize utilization of resources in the system, while the modeling logic includes rules that specify resource utilizations for each component of the system in response to a given operation.

Once created, resource models may be trained in, for example, an operational scenario such as a production environment. Training resource models may include deriving resource costs incurred by components of the system in response to a given operation, and correlating the resource costs to the given operation to generate a resource map. The resource costs may be derived from historical data obtained by interrogating an existing deployment of the system. The training may also include determining workload transformations between components of the system and generating a workload map based on the determined workload transformations.

Resource models may be used to simulate hypothetical scenarios for a computing system. Simulating hypothetical scenarios may include generating a workload of operations for a component of the system and outputting resource utilization and/or operation latencies for the component. The workload of operations may be generated based on either a usage profile assigned to the component, a workload map, or both.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure relates to operational resource modeling usable by, for example, information technology (IT) personnel, to analyze application and computer system performance over a wide range of hypothetical scenarios. Historically, computer system performance analysis has been based on performance models of applications executing on a computer system. The performance models were usually generated using either transaction modeling techniques, which involve large development costs, or trending techniques, which are applicable in a limited range of operational scenarios.

The described operational resource modeling techniques bridge the gap between transaction modeling and trending techniques by providing resource model templates for creating resource models to analyze hardware and/or software deployments in a system. The resource models can be trained using historical data and can then be used for simulation of various hypothetical scenarios such as hardware scaling and/or workload scaling for effective capacity planning. Thus, a wider range of hypothetical scenarios can be covered as compared to trending techniques, and at the same time the development expense associated with transaction models can be mitigated. This type of historical data is often already gathered in many organizations, for trending or other purposes.

Moreover, the resource model templates can be customized to model hardware and software components of a system by automatically interrogating an existing deployment in the system. The relationships between the various components can be automatically configured in the resource model based on correlations determined from the interrogation. In addition, the deployment can be monitored in real-time to generate alerts whenever changes in the deployment render the resource model potentially invalid. Additionally or alternatively, discrepancies between model predictions and performance measurements may indicate misconfiguration of the deployment and/or failure of a component (e.g., a disk drive that is retrying on a failing sector), and an alert can be generated in response.

Figure 1:
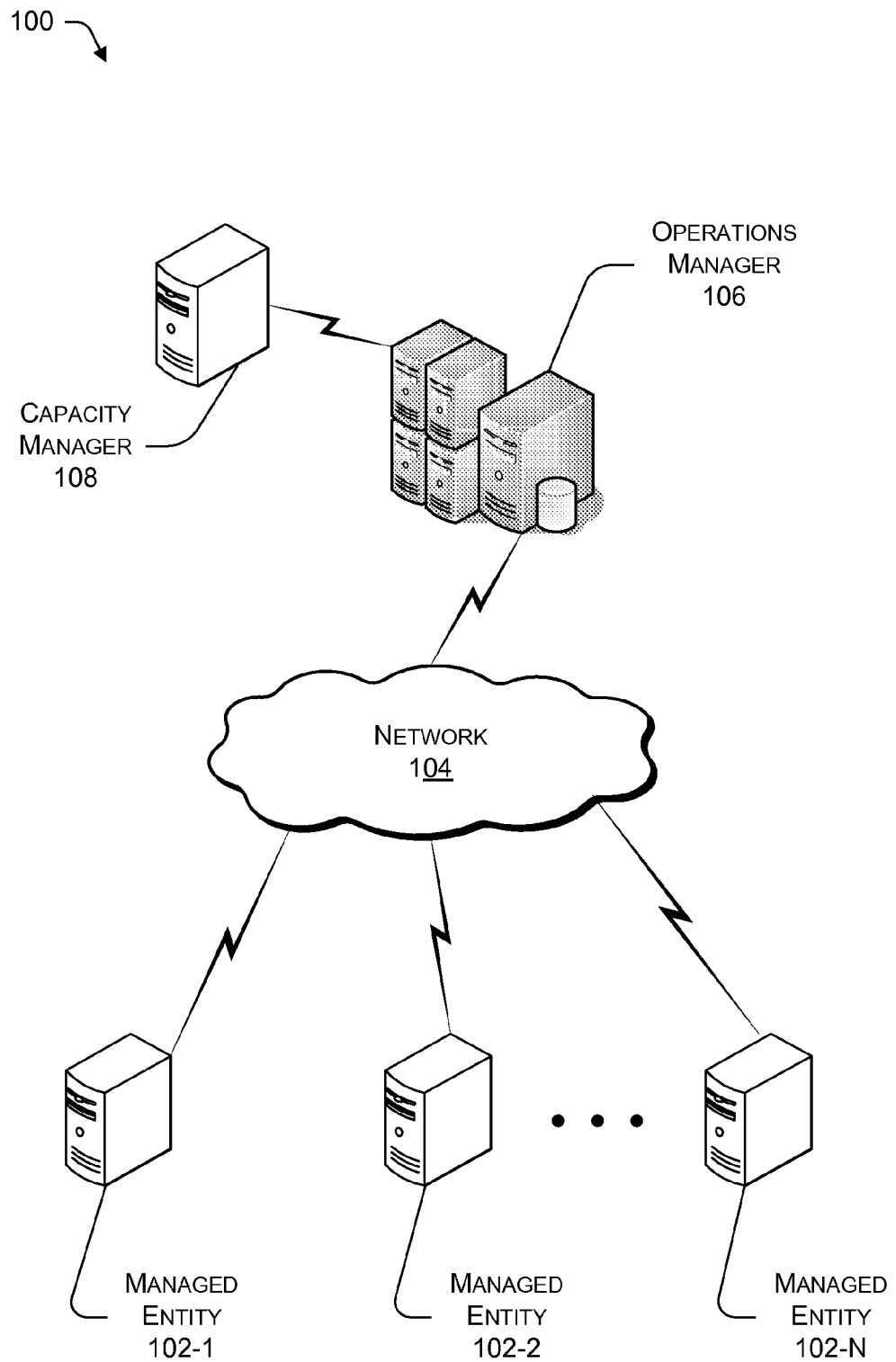
FIG. 1 is a computer environment diagram showing an exemplary system in which operational resource modeling can be implemented.

FIG. 1 is an exemplary computing environment diagram illustrating a deployment of managed entities 102-1, 102-2 . . . 102-N (collectively called 102) in a network 104. The managed entities 102 may be implemented as any of a variety of conventional computing devices, including, for example, a server, a desktop personal computer (PC), a notebook or portable computer, a workstation, a mainframe computer, a mobile computing device, an entertainment device, an internet appliance, etc. The network 104 may be a wireless or a wired network, or a combination thereof. The network 104 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs).

An operations manager 106 monitors deployment of the managed hardware and software entities 102, and maintains a database of information such as hardware and software configurations in the deployment, events or alerts generated by applications executing in the deployment, etc. The operations manager 106 may be implemented as software, hardware (e.g., a computer system), or a combination of software and hardware. In an exemplary implementation, the operations manager 106 may comprise Microsoft System Center Operations Manager (SCOM), available from Microsoft Corporation, headquartered in Redmond, Wash.

A capacity manager 108 is communicatively coupled to the operations manager 106 and can interrogate the operations manager 106 to obtain all or part of the information regarding the hardware and software configurations, workload data, correlations between hardware and software resources in the deployment, etc. The capacity manager 108 uses the obtained information to create and train resource models using resource model templates. The resource models can be used to simulate and analyze performance of hardware and/or software applications in the deployment in various hypothetical scenarios. The capacity manager 108 may be implemented as software, hardware (e.g., a computer system), or a combination of software and hardware. In an exemplary implementation, the capacity manager 108 may comprise System Center Capacity Planner (SCCP), also available from Microsoft Corporation, headquartered in Redmond, Wash.

While resource modeling is described in the context of analyzing existing hardware and software deployments, the concepts described herein are broadly applicable to modeling past, present, and/or planned hardware and/or software deployments. Also, resource modeling may be used to analyze a whole deployment or individual parts thereof.

Figure 2:
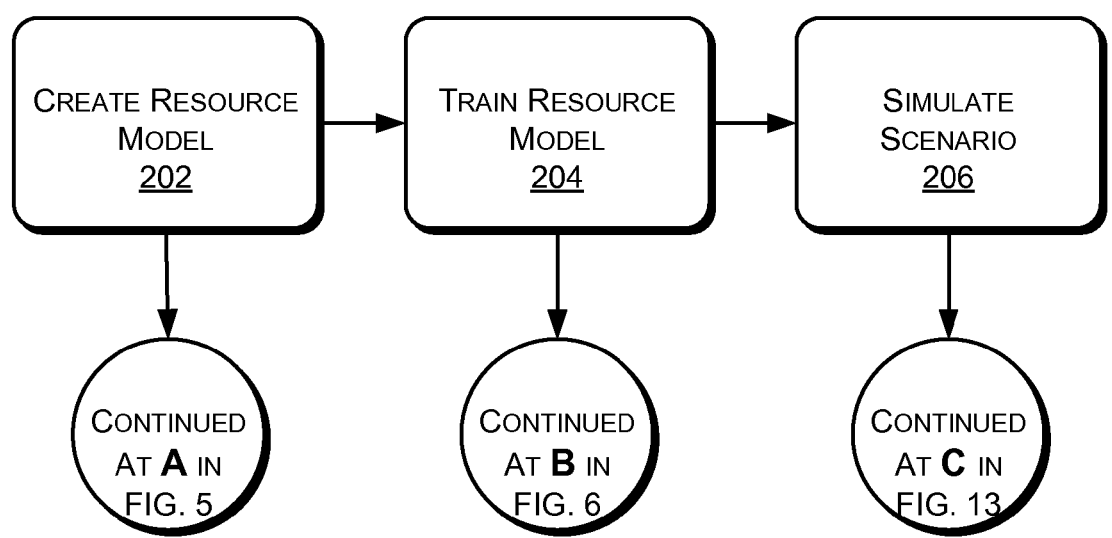
FIG. 2 is a flowchart illustrating an exemplary operational resource modeling process.

In particular, this disclosure describes exemplary techniques for creating and training resource models, and for simulating hypothetical scenarios using resource models. FIG. 2 is a flowchart illustrating the overall resource modeling process 200, including creation 202 and training 204 of a resource model, and simulation 206 of a hypothetical scenario. Details of each of these processes are described in detail below.

Exemplary Architecture

Figure 3:
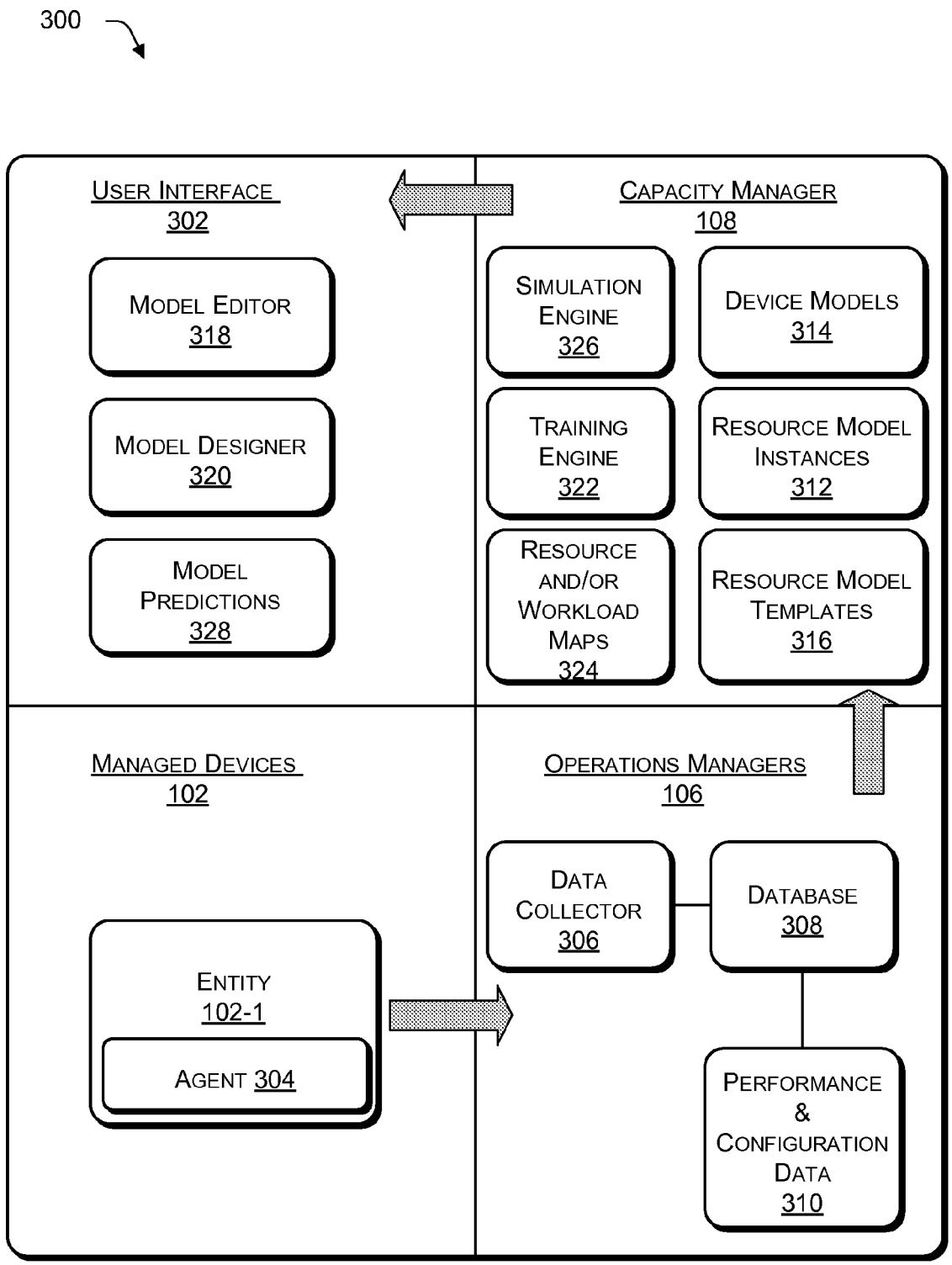
FIG. 3 is a schematic block diagram of an exemplary architecture of the system of FIG. 1.

FIG. 3 is a block diagram showing an exemplary architecture 300 of the system 100 illustrated in FIG. 1, which is usable to create and train resource models, and to simulate hypothetical scenarios. The architecture 300 includes the managed entities 102, the operations manager 106, the capacity manager 108, and a user interface 302.

The managed entities 102 include one or more devices, such as device 102-1, that can be monitored by the operations manager 106, either using an agent 304 or in an agent-less manner. The operations manager 106 uses a data collector 306 to collect deployment and execution data from the managed entities 102. The collected data is stored in a database 308 and includes performance and configuration data 310. In some implementations, database 308 may include multiple data collection and/or archiving components. In one implementation, the database 308 includes an operations database and a data warehouse. The operations database contains detailed short term data that may be post-processed and forwarded to the data warehouse for archival.

The capacity manager 108 interrogates the operations manager 106 for performance and configuration information and uses this information to create resource model instances 312 and configure device models 314. For this, the capacity manager 108 uses resource model templates 316, which provide a framework that is readily usable to create customized resource models for applications in the system. The resource model templates 316 include operating system templates, and platform templates built upon the operating system templates.

The resource model templates 316 identify operations that can be performed by an application executing on a particular platform or operating system, and characteristics that can be modeled in such a system. By way of example, a few possible characteristics that may be modeled include hardware configurations, resources utilized by the application, and functional dependencies between various components in the system, to name just a few.

For example, consider a system in which an e-commerce application is deployed on an IIS web server platform operating in conjunction with a SQL database server. For such a system, the capacity manager 108 determines from an interrogation of the deployment that a combination of resource model templates for e-commerce applications, IIS web servers and SQL database servers can be used to model execution of the e-commerce application on the system.

The resource model template for e-commerce applications declares application layer operations such as authenticate, browse, and purchase, and functional relationships with the IIS web server template. The resource model template for IIS web servers declares platform level operations such as logon, get, and post, and functional relationships with e-commerce application template and the SQL database server template. Similarly, the resource model template for SQL database servers declares platform later operations such as transactions and batches, and functional relationships with the IIS web server template.

The capacity manager 108 then uses a combination of the three templates based on the interrogation of the system deployment to generate customized resource model instances 312 for the system. The capacity manager 108 also configures device models 314 based on the interrogation of the system deployment and the resource model templates 316. The device models 314 include models for determining the degree of utilization of hardware resources, such as a processor, a disk and a network interface card (NIC), by the components in the system.

The capacity manager 108 may additionally or alternatively receive manual inputs from a model user and/or model author through the user interface 302 to customize the resource model instances 312 and configure the device models 314 for the system deployment. The model user may use a model editor 318 to manipulate construction of the hypothetical scenario. The model author may use a model designer 320 to add, remove, or modify one or more operations or functional dependencies to customize the resource model instances 312. After customization, the resource model instances 312 are instantiated in the hypothetical scenario, and are ready for model training.

Once the resource model instances 312 are created and instantiated, a training engine 322 in the capacity manager 108 trains the resource model instances 312 using historical performance data from the database 308 in the operations manager 106. For this, the resource model instances 312 identify data required for training that is to be obtained from the operations manager 106. The training engine 322 obtains the identified data, and constructs resource and workload maps 324 that represent resource costs and workload transformations for a given operation respectively. The training engine 322 trains the resource model instances 312 based on the resource and workload maps 324. While the resource maps are shown as a separate block 324 in FIG. 3, in various implementations, the resource maps may be contained within one or more other components of the capacity manager 108. In one implementation, the resource model templates 316 may contain parameterizations of the resource maps representing resource costs for a given operation, and the resource model instances 312 may contain the parameter values of the resource maps after model training is completed.

The capacity manager 108 then uses a simulation engine 326 to simulate operations on the resource model instances 312 in one or more hypothetical scenarios. Simulation results are presented to a user in the form of model predictions 328 through the user interface 302. The user can choose to further modify the resource model instances 312 based on the model predictions 328 using the model editor 318, and can perform additional simulations to obtain an effective capacity planning solution.

Resource Model Template

A resource model template (also referred to as model template) 316 is an independent unit that provides a framework to create a resource model for an application executing in a system. A variety of different template types are possible. For example, the mode template 316 can be a template representing an operating system, such as Windows, DOS, UNIX, etc. and/or a template representing a platform technology, such as ASP.NET, IIS, SQL server, etc. built on one or more of the operating system templates.

In one implementation, the model template 316 includes various parameters and rules that can be used to create a resource model, a component template structure and enumeration of elements of a trained model such as resource costs, workload scalars, etc. In addition the model template 316 can also include a description of qualitative dependencies between input and output parameters and a description of a method for training the model template 316.

The various parameters in the model template 316 include input parameters, workload characterization parameters, configuration parameters, output parameters and resource consumption parameters, and the like. The resource consumption parameters specify types of resources, such as processor, storage, network, etc. and types of loads, such as transacted, aggregate (or "background"), etc.

The rules in the model template 316 include template instance discovery rules to determine a presence of an application component that can be modeled with the model template 316, discovery rules for automatic discovery of the input parameters from the system, rules for training of all trained elements and rules for reducing the scope of modeling as a reaction to insufficient or incorrect input data.

The component template structure of the model template 316 includes multiple components such as template manifests, modeling logic, and customization fields, which are used by the capacity manager 108 to simulate applications built upon various platforms. The component template structure of the model template 316 can be stored in the form of a data structure in the capacity manager 108.

Figure 4:
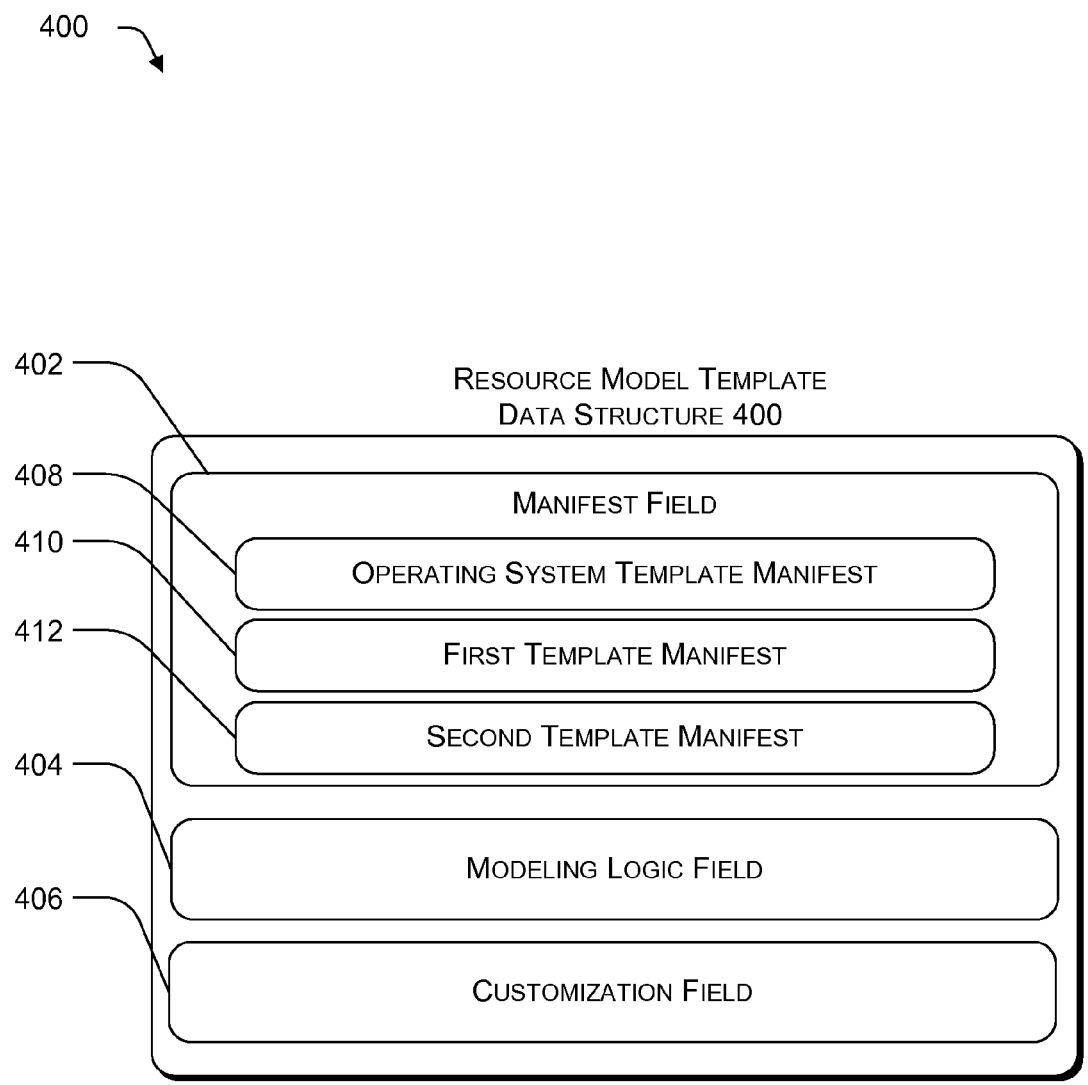
FIG. 4 is an exemplary resource model template data structure.

FIG. 4 illustrates an exemplary resource model template data structure (also referred to as template data structure) 400 corresponding to the component template structure of the model template 316. The template data structure 400 includes a manifest field 402 to store one or more template manifests and a modeling logic field 404 to store modeling logic. In addition, the template data structure 400 can also include a customization field 406 usable to customize the model template 316. In other implementations, template data structures may include any number of these and/or other data fields.

In this implementation, the manifests stored in the manifest field 402 include an operating system template manifest (also referred to as OS template manifest) 408, a first template manifest 410 and a second template manifest 412. The OS template manifest 408 corresponds to an operating system template. In this case, the first template manifest 410 and the second template manifest 412 together correspond to a platform template. While the manifest field 402 in this implementation includes platform and operating system manifests, in other implementations, any number of one or more manifests may be included. The template manifests may be generated manually by an author of the template, or automatically. In one example, the creation of a template manifest is partially automated by interrogating device models to obtain the required parameterization of the resource map. Further, the agents which monitor platforms and/or applications are interrogated to parameterize their workloads. This may involve identification of instrumentation (e.g., perfmon counters) which characterize the rates of operations processed by the platforms or applications. This process may be automated by, for example, the developer of the platform or application marking the instrumentation in the platform or application itself or in the agents monitoring the platform or application in a manner which can be recognized by the template during model creation. For example, when the application is deployed, a model compatibility file may be created which enumerates the workload rate perfmon counters. Then when the template is instantiated, this model compatibility file may be read by the capacity manager 108 and used to populate the manifest with these counters.

Each template manifest stored in the manifest field 402 declares performance metrics required to parameterize either utilization of resources or workloads between components of the system. For example, the OS template manifest 408 declares performance metrics that are required to parameterize utilization of hardware resources. Such performance metrics include, without limitation, performance counters, sampling requirements, etc.

The performance counters measure hardware related parameters such as processor utilization, disk IO, and network IO. Processor utilization can be measured as a percentage of processor or CPU utilization. Disk IO can be measured as the number of disk read/write bytes processed per second, as the number of disk reads/write operations processed per second, and/or as the sequentiality of IO for a particular storage device. Network utilization can be measured as number of bytes sent or received on a particular network interface card (?IC) per second. Performance counters also measure workload related parameters such as the rate of operations, size of operations, cache hit ratio, etc. The sampling requirements include specifications such as required sample size, duration, value range, and the like.

One illustrative platform template includes the first template manifest 410 and the second template manifest 412, and can correspond to a specific platform such as a SQL Server. The first template manifest 410 declares instrumented performance metrics which are required to parameterize resource utilization and a workload between components of the system and is built on the second template manifest 412. The second template manifest 412 may be similar to an OS template manifest and may declare performance metrics usable to parameterize resource utilization and a workload between components of the system. The template data structure 400 corresponds to one illustrative template, in which one template manifest is built on another template manifest. However, templates may be entirely composable. In other examples, templates may have one or more dependencies on parameters of modeling logic of the same or different templates, or may have no dependencies on other templates at all.

The performance metrics declared in the first template manifest 410 and the second template manifest 412 include performance counters, which measure throughput of platform layer operations such as SQL Server transactions per second and SQL Server batch requests per second, for example. Also, performance counters of processes which measure resource utilization due to processing of application and platform workload can be identified in the manifest 402.

The modeling logic field 404 in the template data structure 400 includes modeling logic that uses one or more rules for applying heuristics to (i) transform workload parameterized by the manifest 402 prior to scheduling workload in the device models 314, (ii) account for utilization overheads, (iii) modify operation latencies, or (iv) otherwise affect performance metrics related to the outcome of simulating resource utilization. For example, the modeling logic in a SQL Server template can define a workload heuristic that transforms logical disk IO into physical disk IO, using knowledge of the disk caching behavior of the SQL Server.

The customization field 406 can be used to declare methods for customization of the model template 316 for use with a specific application executing on a particular platform. For example, the model template 316 can be customized by specifying how application level commands are transformed into platform level commands that are compatible with the model template 316. In another scenario, the model template 316 can be customized by specifying component workflow dependencies between two or more components of the system. In yet another scenario, the model template 316 can be customized by specifying scaling limitations of the specific application. As another example, the model template 316 can be customized by specifying a correlation usable to map a measure of a number of client entities to an instrument load modifier declared in a manifest of the model template 316.

In operation, as explained above, the capacity manager 108 can employ the model template 316 to create a resource model such as a performance or capacity model of a server process or a group of processes deployed in a system. For example, an Internet Information Server (IIS) template can be used to create resource models of particular Web servers built on IIS by programmatically identifying the w3wp processes associated with the web site, such as, for example, msdn.microsoft.com.

Resource Model Creation

Figure 5:
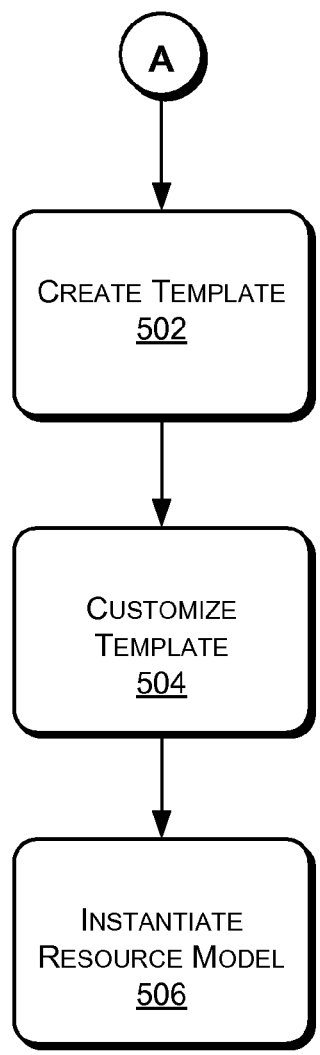
FIG. 5 is a flowchart illustrating details of an exemplary resource model creation process (continued from A in FIG. 2).

FIG. 5 is a flowchart illustrating the resource model creation process. The process includes creation of one or more resource model templates (also referred to as model templates) 316 at block 502, customization of the model templates 316 at block 504 to generate resource model instances 312 and instantiation of the resource model instances 312 at block 506.

A model template 316 can be created at block 502 by generating one or more template manifests corresponding to an operating system or a platform built on an operating system or both, and generating modeling logic that uses rules to specify resource utilizations for one or more components of a system.

At block 504, the model template 316 can be customized for an application executing in the system by specifying various parameters that can affect the performance of the application in the system such as workflow dependencies between the various components in the system, scaling limitations, resource and workload correlations, etc.

The customization of the model template 316 enables the model template 316 to better fit an instance of the application in a hypothetical scenario, such as a deployment of the application in a lab or production environment. It will be understood that it is possible to create a functional model of the application from platform templates without customization, although modeling accuracy and functionality may be reduced.

In one implementation, when computers in a hypothetical scenario are modeled as a connected system, component dependencies can be specified between the connected components to customize a model template for the system. For example, when a hypothetical scenario includes a single web server and a single database server, the web server can depend on the database server, but the converse may not be true. The web server can be modeled using a model template for IIS and the database server can be modeled using a template for SQL Server. To model this hypothetical scenario as a connected system, the IIS model template can specify a workflow dependency on the SQL template. Additionally or alternatively, the workflow dependency may be specified in an application level template built on top of the platform template(s). Specification of work flow dependencies may be performed manually by a user entering the dependency and/or automatically by interrogation of an existing deployment. This interrogation can include but is not limited to correlation of tokens injected into the signatures of operations. Alternatively, the capacity manager may suggest a workflow dependency and the user may be given the option to accept the suggested dependency or to reject the dependency.

In another implementation, custom performance counters which measure workload generated by application level operations can be specified for an application executing on a platform. For example, in the case of an IIS template customized for a web service in an e-commerce application, the custom performance counters may measure a workload generated by browsing a product catalog and a workload generated by purchasing a product from the catalog, for example.

In cases where an application is implemented directly on top of an operating system, the operating system template itself may be customized by specifying custom performance counters which quantify workload. For example, a model of a Microsoft Operations Manager (MOM) Management Server can customize the operating system template by specifying counters which measure rates of alerts, events, and performance data processed by the Management Server.

In another scenario, known scaling limitations of an application which can be difficult to determine automatically from the application configuration or by inspection of historical data can be specified by a model author to customize a model template for the application. For example, if a SQL Server application is known to scale poorly beyond a determined number of processors (e.g., eight processors), then the SQL Server template may limit scheduling of SQL Server compute actions to eight processors during simulation in cases where more than eight processors are available.

In yet another scenario, a heuristic which maps a measure of the number of client entities to an instrumented load modifier may be specified. In such cases, the instrumented load modifier can be declared in the template manifest. For example, a client entity may be a user of an e-commerce application and an instrumented load modifier may be a number of concurrent connections established with the web service. A counter corresponding to the number of concurrent connections can be declared in the manifest of the IIS template. The heuristic may specify that the number of concurrent users using the e-commerce application is a scalar multiple of the number of concurrent connections. The advantage of this heuristic is to provide the model user with a more familiar metric (i.e., the number of client entities) in order to adjust the workload in hypothetical scenarios.

In an exemplary implementation, a model template 316 is customized at block 504 using one or more of the above mentioned customization techniques.

At block 506, an instance of the customized resource model template is bound to an operational scenario. The model instance generally comprises a copy of the model template which is adapted through model training in the operational scenario to become a functioning model of the application in hypothetical scenarios. When instantiated, the model template 316 is ready for training as a standalone model or a component model in combination with other resource models as a part of a larger model of a distributed application.

While the creation of a resource model is described as including creation of a resource model template, it will be understood that the creation of a resource model does not necessarily include the creation of a resource model template. The resource model can also be created using a resource model template selected from a list of already available resource model templates that matches one or more components of a system for which the resource model is created. In that case, a capacity planning program, such as the Capacity Manager component in Microsoft System Center Operations Manager (SCOM), may include one or more resource model templates corresponding to one or more operating systems, platforms, and/or software programs.

Resource Model Training

Figure 6:
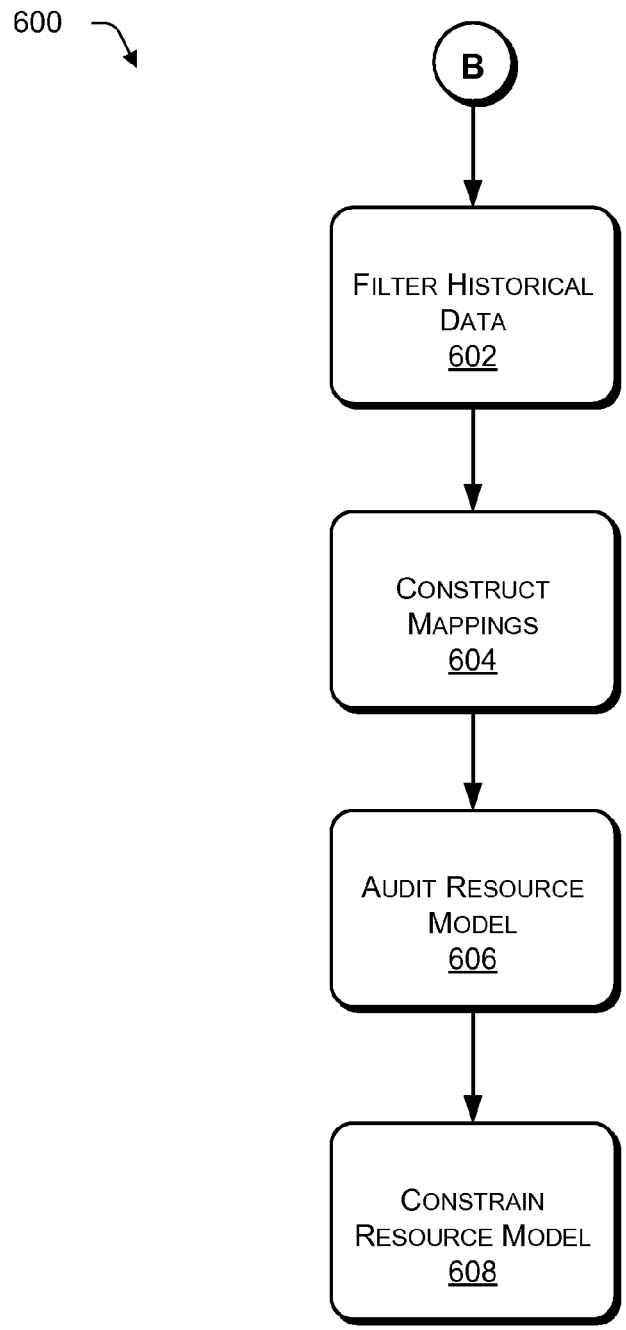
FIG. 6 is a flowchart illustrating details of an exemplary resource model training process (continued from B in FIG. 2).

FIG. 6 is a flowchart illustrating an exemplary resource model training process 600. Model training involves filtering the historical data collected from the operational scenario at block 602, and deriving resource costs and workload transformations from the filtered data. The resource costs for an operation include an amount of processing, storage, and communication required to perform a specified operation, and can be expressed in terms of central processing unit (CPU) cycles, disk IO (e.g., read/write counts, read/write bytes, and read/write sequentiality), network IO (e.g., send/receive bytes), or other resources used for the operation. The workload transformations for an operation include workload dependencies that arise when execution of an operation requires a workflow sequence involving multiple components to be executed. In one implementation, the training engine 322 in the capacity manager 108 determines the resource costs and the workload transformations for an existing deployment automatically from the operations manager 106, by interrogating the database 308 and the performance and configuration data 310.

The historical data may contain defects that can be removed by conditioning the historical data through combination of filtering, workload injection, or a combination of the two. Possible defects include data collected at periods when one or more system components were unavailable, when system exceptions occurred, such as computer rebooting, network blackout, or database restoring, or the like. The training engine 322 can filter the historical data to exclude data collected during such periods as indicated by alerts, events, or performance counters in the operations manager 106.

Other possible defects include cases where a required range and variation of model parameter values is not observed in the historical data, since in such cases the applicability of the trained resource model for capacity planning in hypothetical scenarios might be limited. In such cases, synthetic workload data may be injected along with the historical data to achieve a desired range of operating conditions. In that case, the synthetic workload may be injected by, for example, a workload injector or other module of the operations manager 106.

At block 604, the resource costs and workload transformations determined from the historical data are represented as a resource map and a workload map, respectively. The resource map specifies resource costs for each type of operation, while the workload map specifies workload transformations describing workflow dependencies between components in the hypothetical scenario.

In one implementation, the training engine 322 in the capacity manager 108 determines correlations from the historical data to generate the resource and workload maps 324. It is to be noted that the training engine 322 can obtain these maps under composite workload conditions in a production environment, and is not restricted to obtaining information under monolithic workload conditions from a controlled lab environment in serial fashion. The training engine 322 uses the resource and workload maps 324 to train the resource model instances 312.

At block 606, the resource model instances 312 under training are audited to maintain overall model quality. The overall model quality depends on accuracy of the resource and workload maps 324 used by the training engine 322. The accuracy of the resource map 324 is measured by the error between utilizations predicted using the resource map and actual utilizations observed in the operational scenario for the same workload. The accuracy of the workload map 324 is measured by the error between operations rates predicted using the workload map and actual operations rates observed in the operational scenario.

If the error is determined to be within a predetermined tolerance limit, the training engine 322 terminates the training. Else, the training engine 322 either collects additional historical data from the operations manager 106 to increase the sample size or injects synthetic workload data into the hypothetical scenario for further training.

Further, the training engine 322 may also audit the resource and workload maps 324 during their use by the capacity manager 108 based on a trigger. The trigger can initiate the training if more than a pre-defined time elapses since the last model training or if a configuration change occurs in the operational scenario.

At block 608, the training engine 322 can associate constraints with the resource models undergoing training to constrain model inputs accepted during usage of the resource model for capacity planning by the capacity manager 108. The constraints limit the model inputs to within a range of performance and configuration data obtained during the training period. Predictions can then be provided with confidence metrics which decrease as the distance increases between the model inputs and the data obtained during the training period.

Moreover, in some implementations, to ensure validity of a trained resource model, the training engine 322 may monitor the operational scenario in real-time and provides alerts if configuration changes that would render the trained resource model invalid are detected. In such cases, model training can be manually re-initiated, or the capacity manager 108 can automatically re-initiate training of the resource model. If model re-training fails or predictions significantly deviate from measured observations, then the training engine 322 can generate another alert to indicate that an abnormality in the operational scenario may be present (e.g., failure of a system component).

Figure 7:
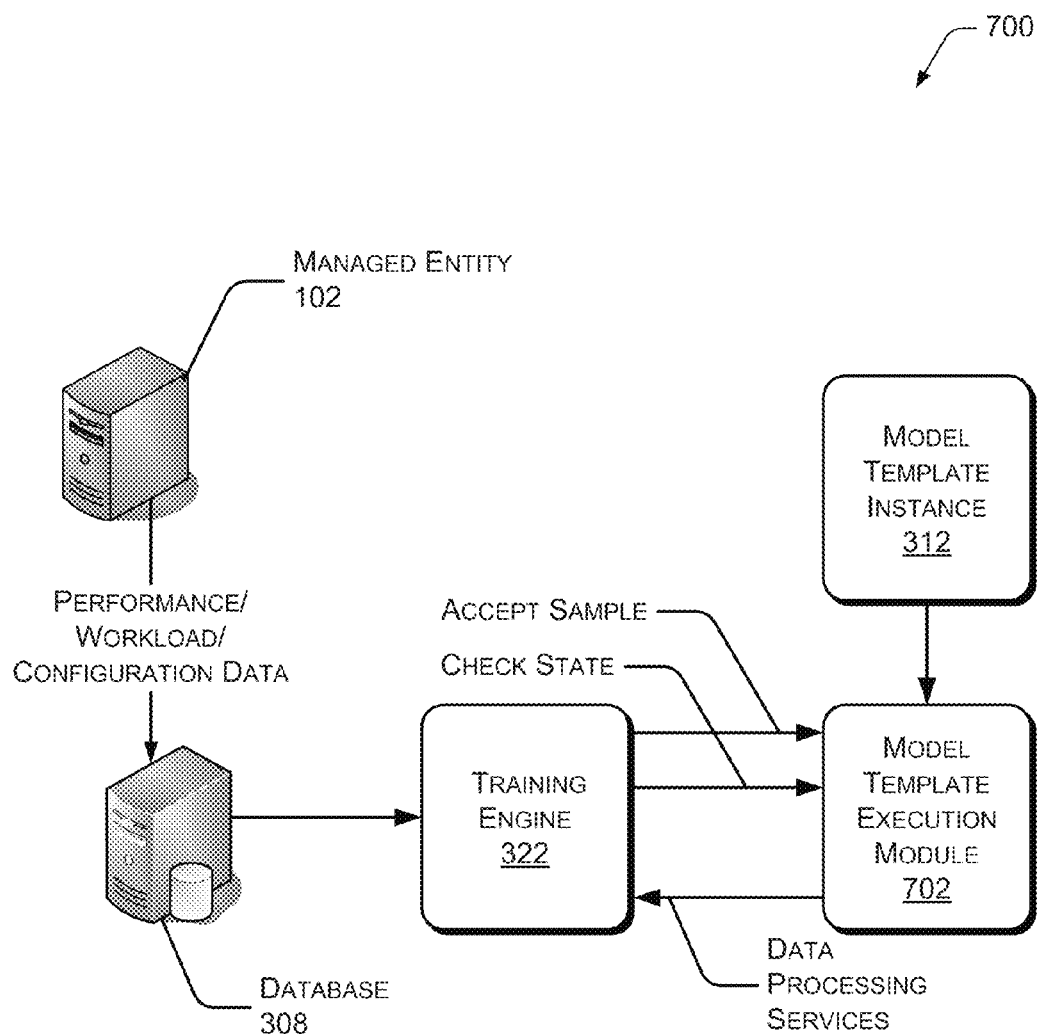
FIG. 7 illustrates an exemplary model training workflow to train an instantiated resource model.

FIG. 7 illustrates an exemplary model training workflow to train an instantiated resource model. The model training workflow begins by loading a model template instance 312 into a model template execution module 702 that exposes parameters in the model template instance 312 in the form of application programming interfaces (APIs) to a model training engine 322. In one implementation, the model template instances 312 can be in the form of XML documents. The model training engine 322 determines the nature of historical data required for training the model template instance 312 by inspecting template input parameters and discovery rules for those parameters that are declared in the model template instance 312.

The model training engine 322 retrieves the historical data from a database 308 that stores configuration, performance and/or workload data from managed entities, such as a managed entity 102. The data can additionally or alternatively be retrieved from the actual system in real time.

The model training engine 322 uses the retrieved data for determining correlations to create resource and workload maps using vectors of sample data. The vectors of sample data are generated by combining utilization data with workload data to describe the system during the same period of time. The resource and workload maps are used to train the model template instance 312.

The model template execution module 702 also performs various computations to compute training elements and to determine a status of training completion. The computations include instructing the training engine 322 to perform computationally intensive common operations, such as data aggregation, matrix inversion, etc. The training engine 322 provides these services to the model template execution module 702 so that the different model templates do not need to re-implement the same procedures.

The training engine 322 determines a state of the model training by analyzing state properties of the model template instance 312 that are recomputed according to modeling logic declared in the model template instance 312. The training state can be computed for all trained elements individually and can indicate problems in the historical data used for training. In case a problem is detected, the training engine 322 can request more historical data from the database 308 or can terminate the training.

Once the training is complete for all elements in the model template instance 312, the model template instance 312 is instantiated in the form of a component model containing fully parameterized resource and workload maps, and can be used for performance analysis and capacity planning by an IT administrator or other automated tools. In addition, the training engine 322 monitors the data in the database in real-time by periodically submitting the vectors of sample data to the model template instance 312 to make the model template instance 312 adjust to changing operation conditions.

Figure 8:
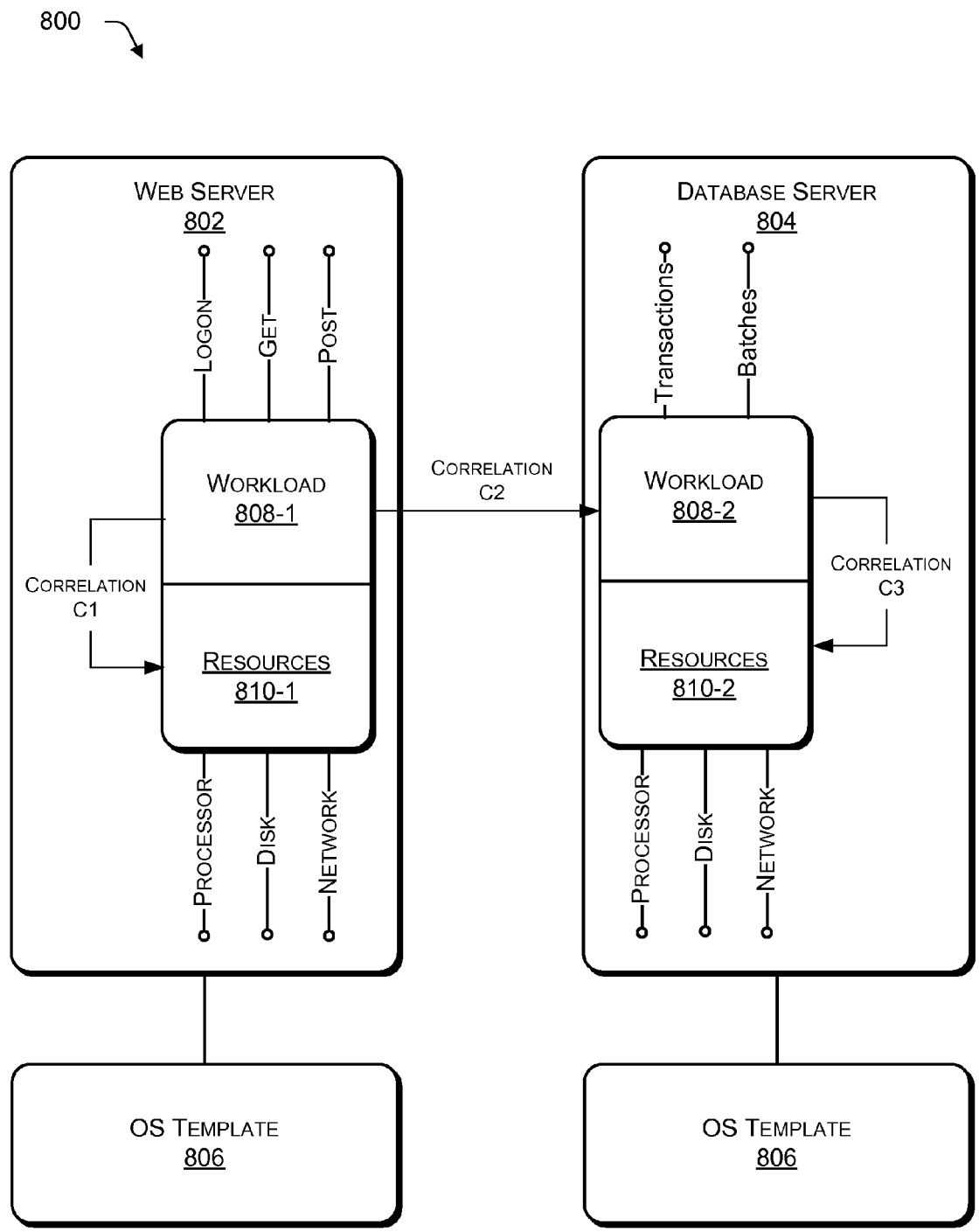
FIG. 8 illustrates correlations determined by a training engine to obtain resource and workload maps for an exemplary system.

FIG. 8 illustrates correlations determined by the training engine 322 to obtain resource and workload maps 324 for an exemplary system. The system, for which resource and workload maps are being generated in this example, includes a web server 802 and a database server 804. The web server 802 depends on the database server 804 for its operation and hence workflow dependencies exist between the two servers. In one implementation, the web server 802 is modeled using a template for IIS and the database server 804 is modeled using a template for SQL Server. Both the IIS template and the SQL Server template inherit from an OS template 806 which declares performance counters for processor, disk IO, and network IO. In addition, the IIS template also specifies a workflow dependency on the SQL template.

In one implementation, the IIS template for the web server 802 declares logon, get, and post operations, while the SQL template for the database server 804 declares transaction and batch request operations. The training engine 322 derives data corresponding to workload 808-1 and resources 810-1 for the web server 802, and data corresponding to workload 808-2 and resources 810-2 for the database server 804 from the database 308.

The training engine 322 then determines correlations C1 between workload 808-1 and resources 810-1 to create a resource map for the IIS template of the web server 802. Similarly, the training engine 322 also determines correlations C3 between workload 808-2 and resources 810-2 to create a resource map for the SQL template of the database server 804. Further, the training engine 322 also determines correlations C2 between workload 808-1 and workload 808-2 to create a workload map for the system.

Methods of creating the resource and workload maps are discussed in detail below with reference to FIGS. 9-12.

Creation of Resource Maps

Resource maps specify unit resource costs of each operation type declared in a template. The resource maps are generated or modeled based on correlations determined by the training engine 322 from historical data. Modeling of resource maps is based on an assumption regarding the manner in which resource utilizations respond to operation rates and may include an effect of background utilization of resources being mapped. The resource utilizations in this example include processor busy time, disk IO, and network IO, while the corresponding resources include a processor, a disk subsystem, and a network.

For example, if resource utilization is assumed to respond linearly to operation rates, then given n operation types declared in a model template, the total utilization $u_k(t_j)$ of resource k at time $t_j$ can be determined using equation 1:

$$u_k(t_j) = \sum_{i=1}^{n} r_i(t_j) \cdot c_{ik}(t_j; p_1 \ldots p_q) + b_k(t_j) \quad (1)$$

where $r_i(t_j)$ is rate of operation type i at time $t_j$, $c_{ik}(t_j; p_1 \ldots p_q)$ is the unit resource cost of operation type i at time $t_j$ and is dependent on configuration and operation parameters $\{p_1 \ldots p_q\}$, and $b_k(t_j)$ is the background utilization of resource k at time $t_j$. Further, it is assumed that configuration and operation parameters which may modify $c_{ik}$ are fixed, and that $c_{ik}$ and $b_k$ are time-independent during the sampling period, i.e., the period for which the historical data was collected. Background utilization $b_k$ is assumed to be uncorrelated with operation rates $r_i(t_j)$.

The correlations can be determined by approximating unit resource costs $c_{ik}$ and background utilization $b_k$ for the historical data. The historical data includes m data samples of operation rates and resource utilizations from an operational scenario. The correlations can therefore be computed using equation 2:

$$\min_{c} \|u - R \cdot c\|_2 \quad (2)$$

where $$R = \begin{pmatrix} r_1(t_1) & \cdots & r_n(t_1) & 1 \\ \vdots & & \vdots & \vdots \\ r_1(t_m) & \cdots & r_n(t_m) & 1 \end{pmatrix}, c = \begin{pmatrix} c_{1k} \\ \vdots \\ c_{nk} \\ b_k \end{pmatrix}, \text{ and } u = \begin{pmatrix} u_k(t_1) \\ \vdots \\ u_k(t_m) \end{pmatrix}.$$

This computation can be performed using an algorithm which provides non-negative values for $c_{ik}$ and $b_k$.

Though the correlations have been determined assuming a linear relationship between resource utilization and operation rates in the example above, it will be understood that in different scenarios, the relationship can be expressed nonlinearly, such as a polynomial function, or many other nonlinear relationships. Moreover, the nonlinear relationship may be pre-defined in the model templates 316, or may be specified by a model author, or may be determined by the training engine 322 as the function that best fits the historical data. Once the manner in which resource utilizations respond to operation rates is determined, equation 2 can be modified accordingly to compute the correlations.

Further, to audit a resource map, the training engine 322 determines whether the error between utilizations predicted using the resource map and actual utilizations observed in the operational scenario for the same workload is less than a maximum tolerated error ϵ, i.e. whether equation 3 is satisfied:

$$\|u - R \cdot c\|_2 \leq \epsilon \quad (3)$$

Figure 9:
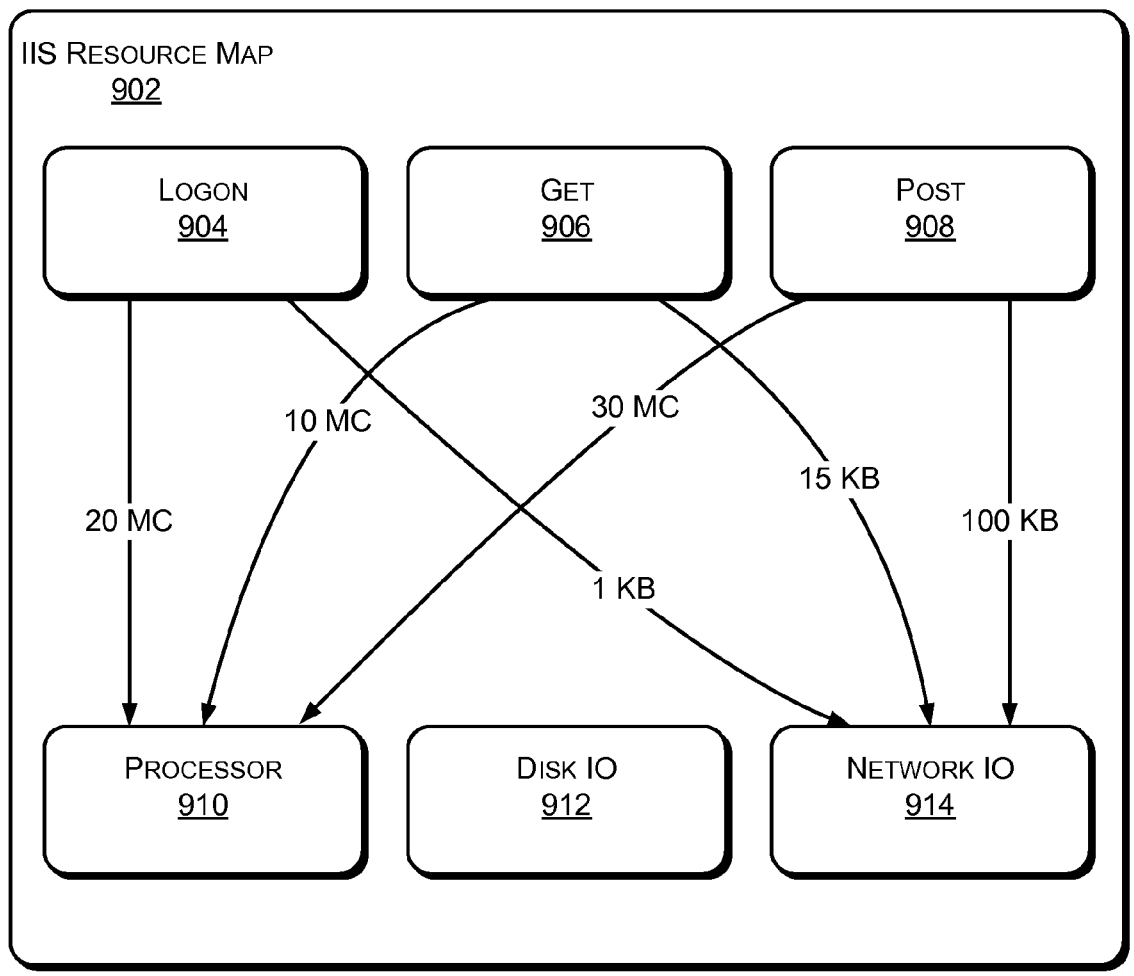
FIG. 9 illustrates an exemplary Internet Information Server (IIS) resource map.

FIG. 9 illustrates an exemplary IIS resource map 902 that can be generated for the IIS template modeling the web server 802 using the correlation C1 as mentioned above with reference to FIG. 8. In one implementation, the correlation C1 can be determined using equations 1 and 2 above. Based on the correlation C1, the training engine 322 determines that resource costs for logon operation 904 include 20 megacycles (MC) of processor 910 and 1 kilobyte (KB) of network IO 914. Similarly, resource costs for get operation 906 include 10 MC of processor 910 and 15 KB of network IO 914. Also, resource costs for post operation 908 include 30 MC of processor 910 and 100 KB of network IO 914. It is to be noted that the training engine 322 determined that disk IO cost 912 is zero for each of the three operations in this example because the operations did not require any disk read or write task to be performed on the IIS web server.

Figure 10:
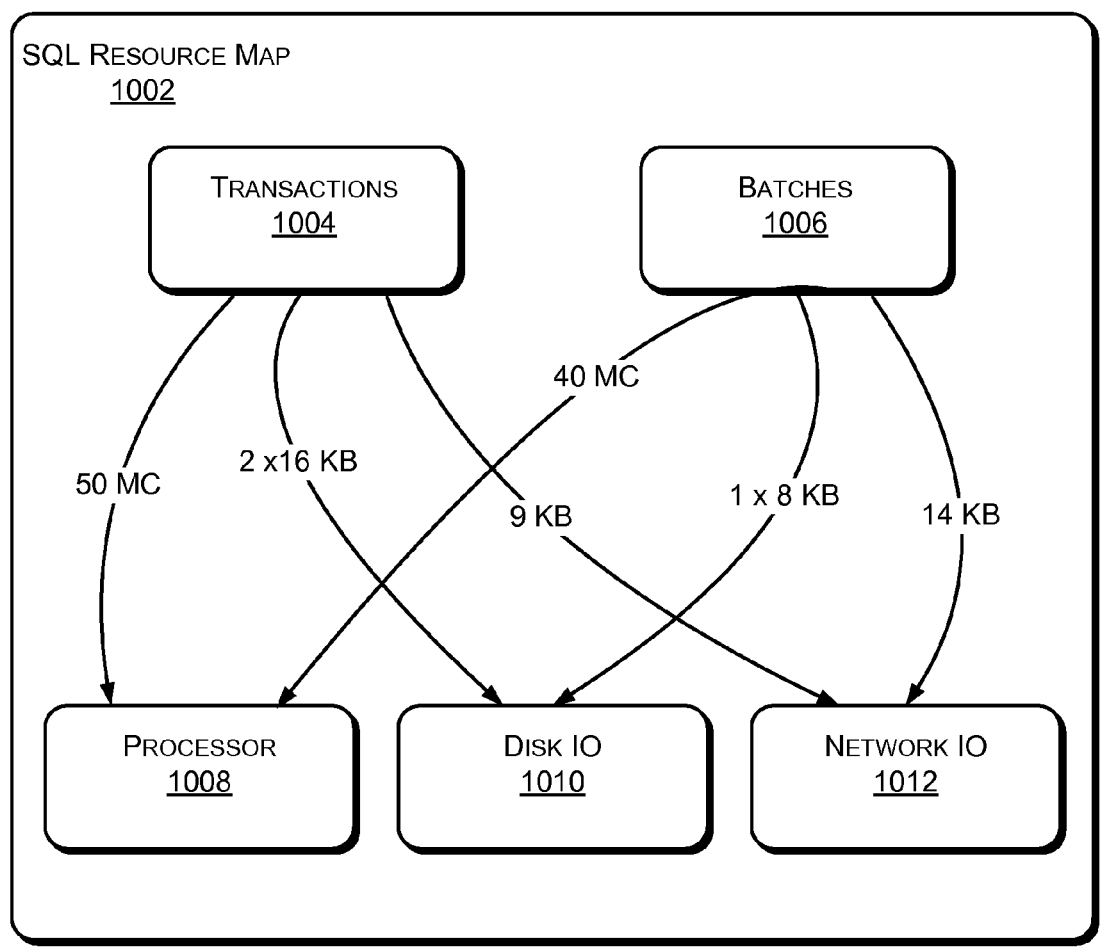
FIG. 10 illustrates an exemplary structured query language (SQL) Server resource map.

FIG. 10 illustrates an exemplary SQL resource map 1002 that can be generated for the SQL template modeling the database server 804 using the correlation C3 as mentioned above with reference to FIG. 8. In one implementation, the correlation C3 can be determined using equations 1 and 2 above. Based on the correlation C3, the training engine 322 determines that resource costs for transactions operation 1004 include 50 MC of processor 1008, two 16 KB of disk IO 1010, and 9 KB of network IO 1012. Similarly, resource costs for batches operation 1006 include 40 MC of processor 1008, one 8 KB of disk IO 1010, and 14 KB of network IO 1012.

Creation of Workload Maps

Workload maps specify workload transformations useful to understand demands on components of the hypothetical scenario due to workflow dependencies between components in the hypothetical scenario. The workload maps are generated or modeled based on correlations determined by the training engine 322 from historical data. The workload transformations are applied to operations between parent and child nodes in a workflow dependency chain.

Modeling of workload maps may be based on an assumption regarding the manner in which rates of operations in a child node respond to a rate of operations in the parent node. For example, if the rates of operations in the child node are assumed to respond linearly to a rate of operations in the parent node, then given n operation types declared in a model template of the parent node, the rate $\tilde{r}_k(t_j)$ of operation type k at time $t_j$ can be determined using equation 4:

$$\tilde{r}_k(t_j) = \sum_{i=1}^{n} r_i(t_j) \cdot w_{ik}(t_j; p_1 \ldots p_q) \quad (4)$$

where $r_i(t_j)$ is rate of operation type i in the parent node at time $t_j$, $w_{ik}(t_j; p_1 \ldots p_q)$ is a weight of operation type i in the parent node at time $t_j$ dependent on configuration and operation parameters $\{p_1 \ldots p_q\}$. Further, it can be assumed that configuration and operation parameters which may modify $w_{ik}$ are fixed, and that $w_{ik}$ is time independent during the sampling period.

The correlations can be determined by approximating weights $w_{ik}$ for the historical data. The historical data includes m data samples of operation rates from an operational scenario. The correlations can therefore be computed using equation 5:

$$\min_{w} \|\tilde{r} - R \cdot w\|_2 \quad (5)$$

where $$R = \begin{pmatrix} r_1(t_1) & \cdots & r_n(t_1) \\ \vdots & & \vdots \\ r_1(t_m) & \cdots & r_n(t_m) \end{pmatrix}, w = \begin{pmatrix} w_{1k} \\ \vdots \\ w_{nk} \end{pmatrix} \text{ and } \tilde{r} = \begin{pmatrix} \tilde{r}_k(t_1) \\ \vdots \\ \tilde{r}_k(t_m) \end{pmatrix}$$

This computation can be performed by an algorithm which provides non-negative values for $w_{ik}$.

Further, to audit a workload map, the training engine 322 determines whether the error between operations rates predicted using the workload map and actual operations rates observed in the operational scenario is less than a maximum tolerated error ϵ, i.e., whether equation 6 is satisfied:

$$\|\vec{r} - R \cdot w\|_2 < \epsilon \quad (6)$$

For example, in a system modeled by FIG. 8 explained above, the IIS template modeling the web server 802 uses the SQL template modeling the database server 804 to fulfill its requests. Therefore, the IIS template modeling the web server 802 can be a parent node in a workflow dependency chain and the SQL template modeling the database server 804 can be a child node. Hence, a workload map for the system expresses the rate of SQL operations generated as a function of the rate of IIS operations for each operation declared in the SQL template. The function may be linear, or a more complex function depending on the relationships between components. If the function is linear, then the SQL workload map may be expressed as a linear combination of the IIS operation rates.

Figure 11:
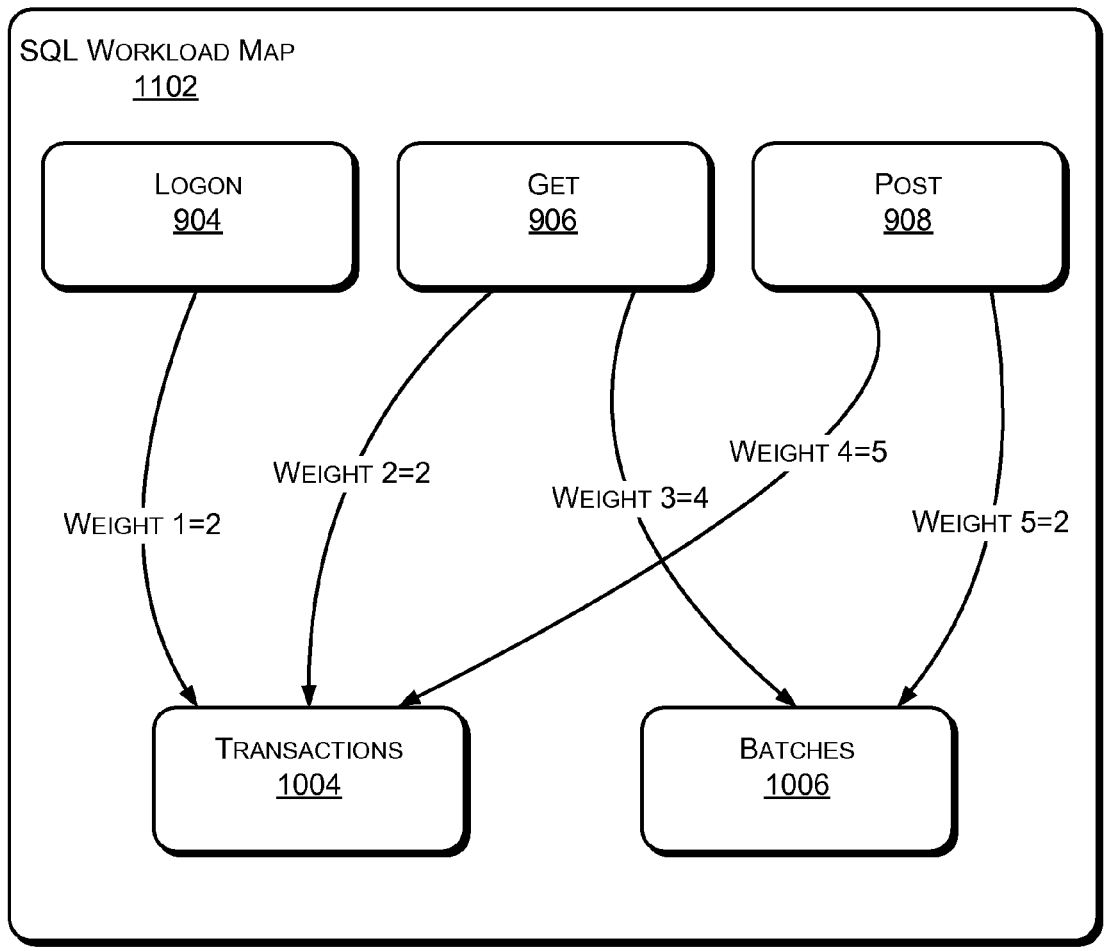
FIG. 11 illustrates an exemplary SQL Server workload map.

FIG. 11 illustrates an exemplary SQL workload map 1102 for the rate of SQL template operations expressed as a linear combination of the rate of IIS template operations. The SQL operations include transactions 1004 and batches 1006, while the IIS operations include logon 904, get 906, and post 908. The workload map is determined based on equations 3 and 4:

$$\text{TransactionRate} = \text{weight1} \cdot \text{LogonRate} + \text{weight2} \cdot \text{GetRate} + \text{weight4} \cdot \text{PostRate} \quad (3)$$

$$\text{Batch RequestRate} = \text{weight3} \cdot \text{GetRate} + \text{weight5} \cdot \text{PostRate} \quad (4)$$

where, weights {weight1, . . . , weight5} are unit-less quantities.

Workload maps can also be generalized to express a composition of resource models as workflow dependency chains of arbitrary depth. For example, in a system in which an e-commerce application is executed over a web server platform such as an IIS server, a workflow dependency exists between application layer operations in a resource model of the e-commerce application and IIS operations in a resource model of the IIS server.

Figure 12:
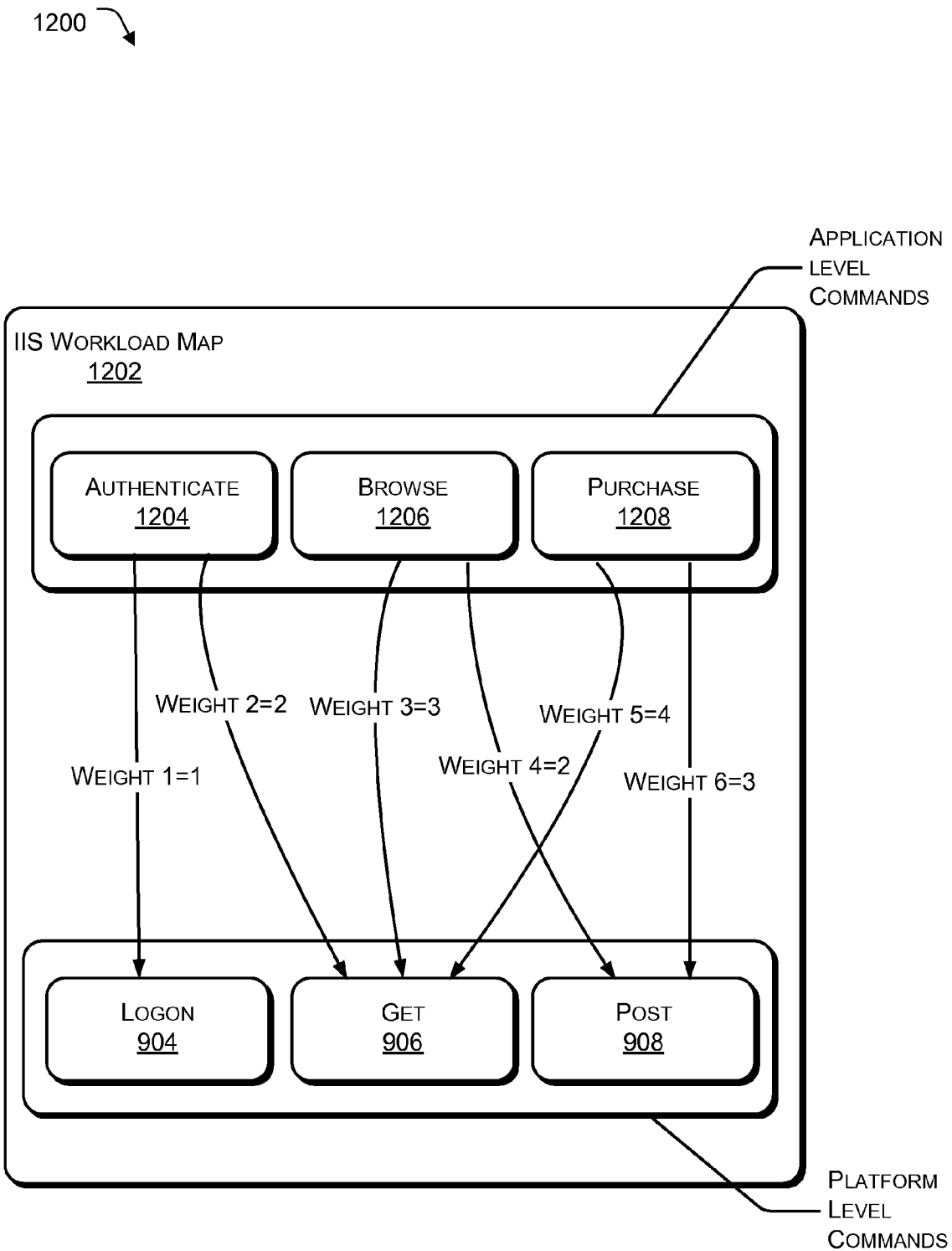
FIG. 12 illustrates an exemplary IIS workload map.

FIG. 12 illustrates an exemplary IIS workload map 1202 for the rate of IIS platform layer operations expressed as a linear combination of the rate of e-commerce application layer operations. The e-commerce application layer operations include authenticate 1204, browse 1206 and purchase 1208, while the IIS platform layer operations include logon 904, get 906 and post 908.

Further, in a system that includes a SQL database server along with an IIS web server and an e-commerce application, a workflow dependency chain can be expressed as follows:

$$\{\text{authenticate, browse, purchase}\} \xrightarrow{IIS} \{\text{log on, get, put}\} \xrightarrow{SQL} \{\text{transactions, batches}\}$$

where the first arrow (from left to right) represents the workload map for the IIS resource model, and the second arrow represents the workload map for the SQL resource model.

Simulation of Hypothetical Scenarios

Figure 13:
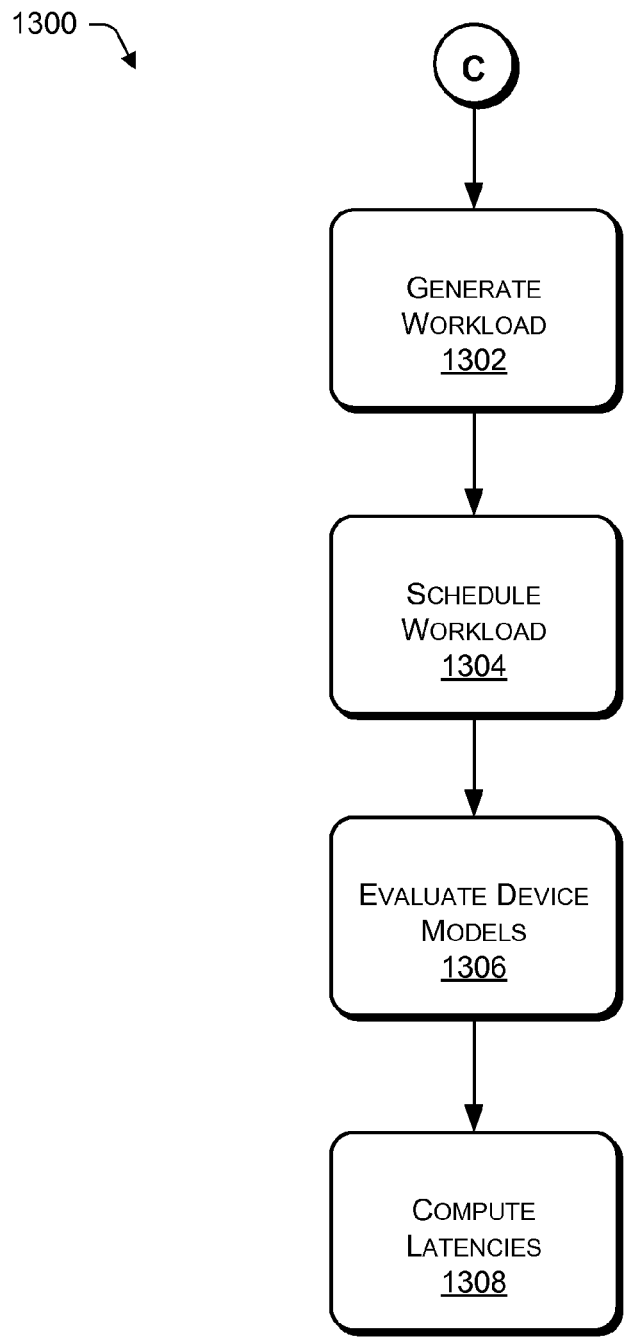
FIG. 13 is a flowchart illustrating details of an exemplary resource model simulation process (continued from C in FIG. 2).

FIG. 13 is a flowchart illustrating an exemplary resource model simulation process 1300. As a result of the simulation process 1300, the simulation engine 326 computes performance statistics for the system, such as percentage resource utilization and operation latencies using the trained resource models. The performance statistics help a model user to determine which deployments are best suited to meet objectives such as satisfying a service level agreement, satisfying cost constraints, etc. Thus the model user may use simulation to analyze whether any hardware and/or software component changes are required in the system, and which changes would be most effective.

The model user can use the simulation process 1300 to analyze the impact of changes, such as hardware scaling and workload scaling, on the performance of an application in hypothetical scenarios. Hardware scaling refers to adding, removing, and/or modifying simulated hardware components of the system, while application configuration and workload conditions remain fixed, to simulate how changes in hardware components affect utilization of hardware components and latencies of operations. Workload scaling refers to increasing or decreasing the rate or size or other parameters of simulated operations while the system configuration remains fixed, to simulate how workload changes in the system affect hardware utilization and latencies of operations.

Workload scaling can be performed in a model of an autonomous system, i.e., a system in which components are not connected, by independently changing rates of individual operations associated with each resource model. For example, the rates of IIS operations may be changed independently of the rates of SQL operations if IIS and SQL are deployed on unconnected computing devices.

However, in a model of a connected system, workflow dependencies exist between components in the system, which establish the components as parent and child nodes in a workflow dependency chain. In such a case, rates of individual operations associated with the resource model of the parent node can be changed independently. Any changes to the workload in the parent node will affect the workload and performance of the component containing the child node.

The simulation process begins at block 1302 with generation of workloads. The simulation engine 326 generates workloads for each component of the system in accordance with a usage profile input by the model user for each resource model instance and/or the workload maps generated during training.

In a connected system, which includes parent and child nodes, the workload map expresses the rate of operations generated by the resource model in the child node as a function of the rate of operations generated by the resource model in the parent node. The simulation engine 326 may generate a workload in the parent node in accordance with the usage profile input by the model user for that resource model instance, for example. Further, the simulation engine 326 may generate a workload in the child node by applying the workload map to operation rates in the parent node.

Workload generated by 1302 creates actions at block 1304, to be executed by the simulated component in the system. These actions are scheduled onto device models 314. The actions may include execution of computations on a processor, read/write actions on a disk, communication via a NIC, or the like. Moreover, in this implementation, the communications operations in the simulation can be parameterized by both send and receive costs for the same component. For example, when data is communicated over a network interface, the data sent and received by the communication action can be scheduled onto the send and receive channels of the NIC device model of the same component. This facilitates simulation of an individual component of the system without knowledge of other components of the system.

At block 1306, device models 314 evaluate the workload 1302 scheduled in 1304 to determine resource utilizations such as, for example, percentage CPU utilization, disk IO and network IO in the simulated hypothetical scenario.

At block 1308, the simulation engine 326 computes latencies of operations. A latency of an operation can be estimated by summing latency contributions from each component in the system involved in processing actions of the operation. The latency, thus computed, generally represents an upper bound of latencies encountered during execution of the operations, since it ignores the possibility of parallel execution of some or all of the operations.

In a model of a connected system, the latency of an operation in a child node may be calculated independently of the latency of an operation in a parent node. However, the latency of operations in the parent node may depend on the latencies of dependent operations in the child node. Therefore, an upper bound for the latency of an operation in the parent node may be estimated using various different methods.

In one method, "exclusive latency" of an operation may be estimated independently of the latencies of operations of the child node. In another method, "inclusive latency" may be estimated as a sum of the exclusive latency and the latency contributions from the dependent child operations. In such a case, the latency contributions from the dependent child operations may be weighted according to the workload map. The weights may be used to represent the number of times such latency contributions from the dependent child operations can occur for every parent operation.

Figure 14:
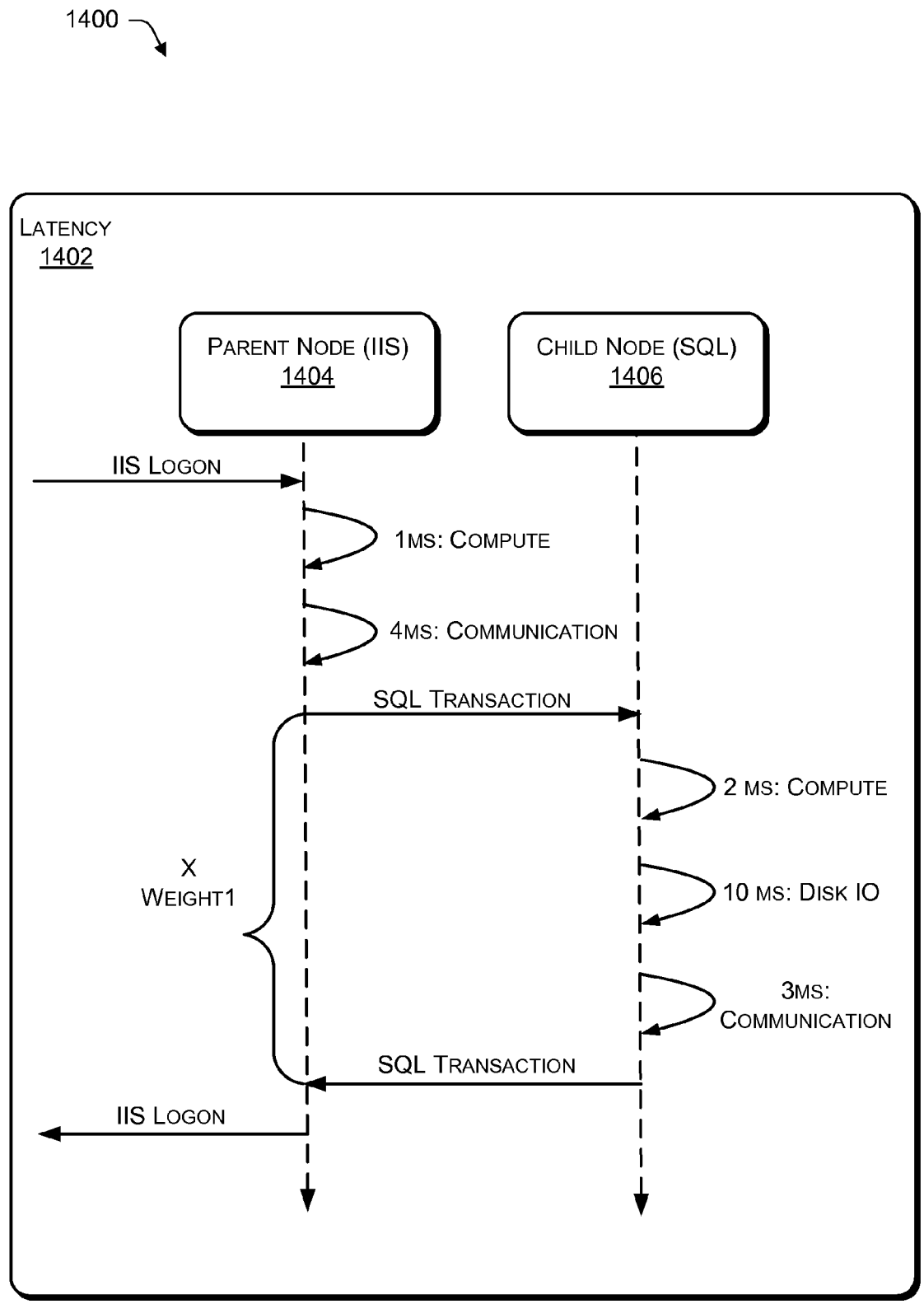
FIG. 14 is a sequence diagram illustrating sources of latency in an exemplary system.

FIG. 14 is a sequence diagram 1400 illustrating sources of latency 1402 in an exemplary connected system. The exemplary system includes an IIS web server as a parent node 1404 and a SQL server as a child node 1406. The IIS web server may have one or more applications running thereon. To access the IIS web server, the application may issue an IIS logon operation to the IIS server parent node 1404. In one implementation, latencies occurring as a result of the logon operation can be determined as explained below.

In the illustrated implementation, the logon operation causes a computation latency of 1 ms and a communication latency of 4ms on the parent node 1404. Thus an exclusive latency of the logon operation is 1 ms+4 ms=5 ms. Further, the logon operation results in SQL transactions with the child node 1406. The SQL transactions cause a computation latency of 2 ms, a disk IO latency of 10 ms and a communication latency of 3 ms. Thus an inclusive latency of the logon operation is 5 ms+weight1*(2 ms+10 ms+3 ms). The weight1 can be determined from a workload map of the system as described earlier. For example, if the workload map specifies a value of 2 (indicating that the child node operations will be performed twice for every parent node operation) for the weight1, the inclusive latency can be calculated to be equal to 35 ms.

Exemplary methods of creating and training resource models, and simulating hypothetical scenarios using resource models are described above. Some or all of these methods may, but need not, be implemented at least partially by an architecture such as that shown in FIG. 3. Also, it should be understood that certain acts in the methods need not be performed in the order described, may be rearranged, modified, and/or may be omitted entirely, depending on the circumstances.

Any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. One or more computer-readable storage media comprising computer-executable instructions for implementing a method comprising:
   deriving a resource cost incurred by each of multiple components of a system in response to processing a given operation, wherein at least two of the multiple components are different;
   correlating a resource utilization incurred by each of the multiple components of the system with the given operation;
   generating a resource map based on the correlation of the resource utilizations with the given operation;
   determining workload transformations applied to the given operation at each interface between the at least two different components of the system;
   generating a workload map based on the determined workload transformations applied to the given operation at each interface between the at least two different components of the system; and
   storing the workload map in memory.

2. The one or more computer-readable storage media of claim 1, wherein the resource costs, weights of the operations, are derived from historical data obtained from an existing deployment of the system.

3. The one or more computer-readable storage media of claim 2, wherein the historical data is filtered to exclude data collected during periods in which one or more system components is unavailable or is experiencing conditions out of scope of the model.

4. The one or more computer-readable storage media of claim 2, wherein the historical data is augmented with synthetically injected workload data to achieve a desired range of operating conditions.

5. The one or more computer-readable storage media of claim 1, wherein the system comprises at least one software component and at least one hardware component.

6. The one or more computer-readable storage media of claim 1, wherein the correlating comprises determining a function, algorithm, or parameters that fit historical resource utilization data.

7. The one or more computer-readable storage media of claim 1, further comprising determining a workflow dependency between components of the system prior to determining the workload transformations.

8. The one or more computer-readable storage media of claim 1, further comprising auditing the resource model to determine an error between resource utilizations approximated using the resource map and actual measured resource utilizations, and an error between a workload approximated using the workload map and an actual measured workload.

9. The one or more computer-readable storage media of claim 1, wherein determining workload transformations comprises discerning a function expressing a rate of operations of one component at the interface to a rate of operations of another component at the interface.

10. A computer implemented method of generating a resource map of a system, the method comprising:
- deriving a resource cost incurred by each of multiple components of the system in response to processing a given operation based on historical data obtained from an existing deployment of the system, wherein at least two of the multiple components are different;
- correlating a resource utilization incurred by each of the multiple components of the system with the given operation;
- generating a resource map based on the correlation of the resource utilizations with the given operation; and
- storing the resource map in memory.

11. The computer implemented method of claim 10, wherein the historical data is filtered to exclude data collected during periods in which one or more system components is unavailable or is experiencing conditions out of scope of the model.

12. The computer implemented method of claim 10, wherein correlating a resource utilization incurred by each of the multiple components of the system in response to a given operation comprises determining a function that fits the historical resource utilization data.

13. The computer implemented method of claim 10, wherein the resource map includes resource utilzation associated with the given operation and resource utilization associated with background load.

14. A computer implemented method of generating a workload map of a system, the method comprising:
- determining a workflow dependency between components of the system, wherein at least two of the components are different;
- determining workload transformations applied to a given operation at each interface between the at least two different components of the system;
- generating a workload map based on the determined workload transformations applied to the given operation at each interface between the at least two different components of the system; and
- storing the workload map in memory.

15. The computer implemented method of claim 14, wherein determining a workflow dependency between components of the system comprises interrogating templates of each of the multiple components and inferring a workflow dependency based on the results of the interrogation.

16. The computer implemented method of claim 14, wherein determining workload transformations comprises discerning a function expressing a rate of operations of one component at the interface to a rate of operations of another component at the interface.

17. The computer implemented method of claim 14, wherein the system comprises at least one software component and at least one hardware component.

* * * * *